US011483400B2

(12) United States Patent
Zhu et al.

(10) Patent No.: US 11,483,400 B2
(45) Date of Patent: Oct. 25, 2022

(54) HIGHLY AVAILABLE VIRTUAL INTERNET PROTOCOL ADDRESSES AS A CONFIGURABLE SERVICE IN A CLUSTER

(71) Applicant: Oracle International Corporation, Redwood Shores, CA (US)

(72) Inventors: Ming Zhu, Redwood City, CA (US); Harsha Kancharthi, Santa Clara, CA (US)

(73) Assignee: Oracle International Corporation

( * ) Notice: Subject to any disclaimer, the term of this patent is extended or adjusted under 35 U.S.C. 154(b) by 0 days.

(21) Appl. No.: 17/195,973

(22) Filed: Mar. 9, 2021

(65) Prior Publication Data
US 2022/0294859 A1 Sep. 15, 2022

(51) Int. Cl.
*H04L 67/2895* (2022.01)
*H04L 67/1061* (2022.01)
*H04L 45/02* (2022.01)
*H04L 61/5007* (2022.01)
*H04L 67/00* (2022.01)

(52) U.S. Cl.
CPC .......... *H04L 67/2895* (2013.01); *H04L 45/02* (2013.01); *H04L 61/5007* (2022.05); *H04L 67/1072* (2013.01); *H04L 67/34* (2013.01)

(58) Field of Classification Search
CPC ..... H04L 67/2895; H04L 67/34; H04L 45/02; H04L 61/2007; H04L 67/1072
See application file for complete search history.

(56) References Cited

U.S. PATENT DOCUMENTS

| 6,549,996 B1* | 4/2003 | Manry, IV | G06F 12/1036 711/147 |
| 6,976,258 B1* | 12/2005 | Goyal | G06F 9/5055 718/104 |
| 8,612,413 B2* | 12/2013 | Ghosh | H04L 67/289 707/706 |
| 8,671,176 B1* | 3/2014 | Kharitonov | H04L 45/02 709/223 |
| 8,788,668 B2* | 7/2014 | Takemura | H04L 67/1031 709/226 |
| 9,571,603 B2* | 2/2017 | Evens | H04L 69/40 |

(Continued)

FOREIGN PATENT DOCUMENTS

WO  WO-2017127138 A1 *  7/2017  ......... H04L 63/0884

OTHER PUBLICATIONS

Bauer, M, et al., "Oracle® Real Application Clusters: Administration and Deployment Guide, 11g Release 1 (11.1)", Oracle Corporation, (Jan. 2009).

*Primary Examiner* — Patrice L Winder
(74) *Attorney, Agent, or Firm* — Vista IP Law Group, LLP

(57) ABSTRACT

A computer program product, system, and computer implemented method comprises a multi-layered approach to virtual IP address assignment, where a managing computing node may control the generation of virtual IP addresses and assignment thereof to respective computing nodes, and where each respective computing node can control the allocation and binding of those virtual IP addresses to applications for the virtual IP addresses assigned to that computing node. Furthermore, in some embodiments, the approach includes a process to re-allocate virtual IP addresses to rebalance resources already allocated to a computing node and to address changing conditions.

20 Claims, 12 Drawing Sheets

(56) References Cited

U.S. PATENT DOCUMENTS

| | | | | |
|---|---|---|---|---|
| 9,813,374 | B1* | 11/2017 | Magerramov | H04L 61/2007 |
| 10,439,882 | B2* | 10/2019 | Amin | H04L 45/02 |
| 10,616,178 | B2* | 4/2020 | Ryu | H04L 69/40 |
| 11,153,265 | B1* | 10/2021 | Fayed | H04L 61/5007 |
| 2013/0326066 | A1* | 12/2013 | Sahlberg | H04L 61/5007 |
| | | | | 709/226 |
| 2015/0271075 | A1* | 9/2015 | Zhang | H04L 45/745 |
| | | | | 370/235 |
| 2016/0112288 | A1* | 4/2016 | Izhak-Ratzin | H04L 43/0882 |
| | | | | 370/242 |
| 2020/0204481 | A1* | 6/2020 | Heron | H04L 45/22 |
| 2020/0387404 | A1* | 12/2020 | Baxter | G06F 9/5077 |
| 2021/0081186 | A1* | 3/2021 | Trossen | G06F 9/455 |

\* cited by examiner

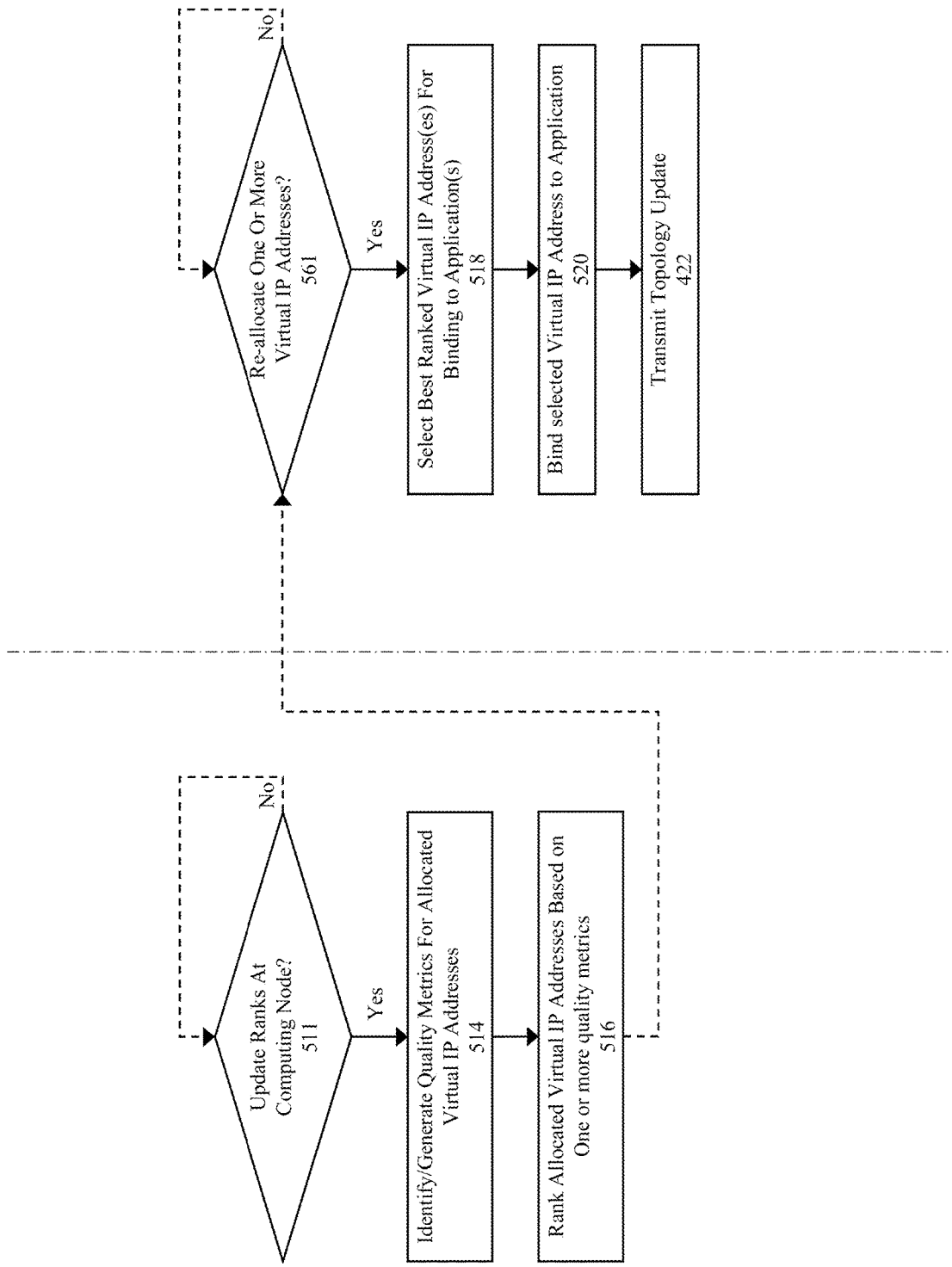

HIGHLY AVAILABLE VIRTUAL INTERNET PROTOCOL ADDRESSES AS A CONFIGURABLE SERVICE IN A CLUSTER

BACKGROUND

Modern computing systems handle large amounts of data. This data is often exchanged across or within networks. To facilitate communications between devices, either within the same network and across networks, internet protocol (IP) addresses are assigned to respective computing devices. For the most part, within a single network each IP address is assigned to only one computing device.

For example, in a network having multiple computing devices, each network interface card within a respective computing device of the multiple computing devices is assigned, or bound to, an IP address. These IP addresses are used by applications to communicate with other instances of components/modules associated with the same application or with different applications or components/modules thereof. However, one difficulty in managing these communications is that these IP addresses are normally tied to a physical network interface card and normally only one IP address can be assigned to each respective hardware device. Because IP addresses are assigned to a single hardware device, when that hardware device fails, multiple operations may need to take place to restore/reroute communications. This takes time. Additionally, because the IP addresses are bound to physical hardware and associated with an application, movement of those applications is more difficult.

One approach to addressing these issues is virtual IP addresses. There are two main advantages to virtual addressing over physical addressing: Availability and Mobility. Virtual IP addresses remove at least some of these constraints because they can more easily utilize different network interface devices. Additionally, multiple virtual IP addresses can be associated with a single corresponding piece of hardware (e.g., network interface card) or even multiple interface devices.

Regarding availability, if a virtual IP address is defined on a host with more than one physical network interface card (NIC), the virtual IP address can be used to communicate to another node through a virtual IP address using any of the physical NICs on that host. This provides application-level transparency. Generally, these advantages are useful for virtual private networks, quality of service (QOS), and link failover.

An application may also be designed such that it can utilize one or more additional IP addresses dynamically. However, dynamic IP address utilization without more requires significant management logic within the application.

Unfortunately, current solutions fall short of achieving at least both high availability and mobility.

Therefore, there is a need for an approach to provide highly available virtual internet protocol addresses that is both highly available and mobile.

SUMMARY

Embodiments of the present disclosure provide a method, apparatus, and product for highly available virtual internet protocol addresses as a configurable service in a cluster.

The approach disclosed herein generally comprises a multi-layered approach to virtual IP address assignment, where a managing computing node may control the generation of virtual IP addresses and assignment thereof to respective computing nodes, and where each respective computing node can control the allocation and binding of those virtual IP addresses assigned to that computing node. Furthermore, in some embodiments, the approach includes a process to re-allocate virtual IP addresses to rebalance resources already allocated to a computing node and to address changing conditions.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIGS. 5A-5B illustrate example flows for allocation/re-allocation of one or more virtual IP addresses to an application instance based on a node specific quality metric according to some embodiments.

DETAILED DESCRIPTION OF THE EMBODIMENTS OF THE DISCLOSURE

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Figure 1:
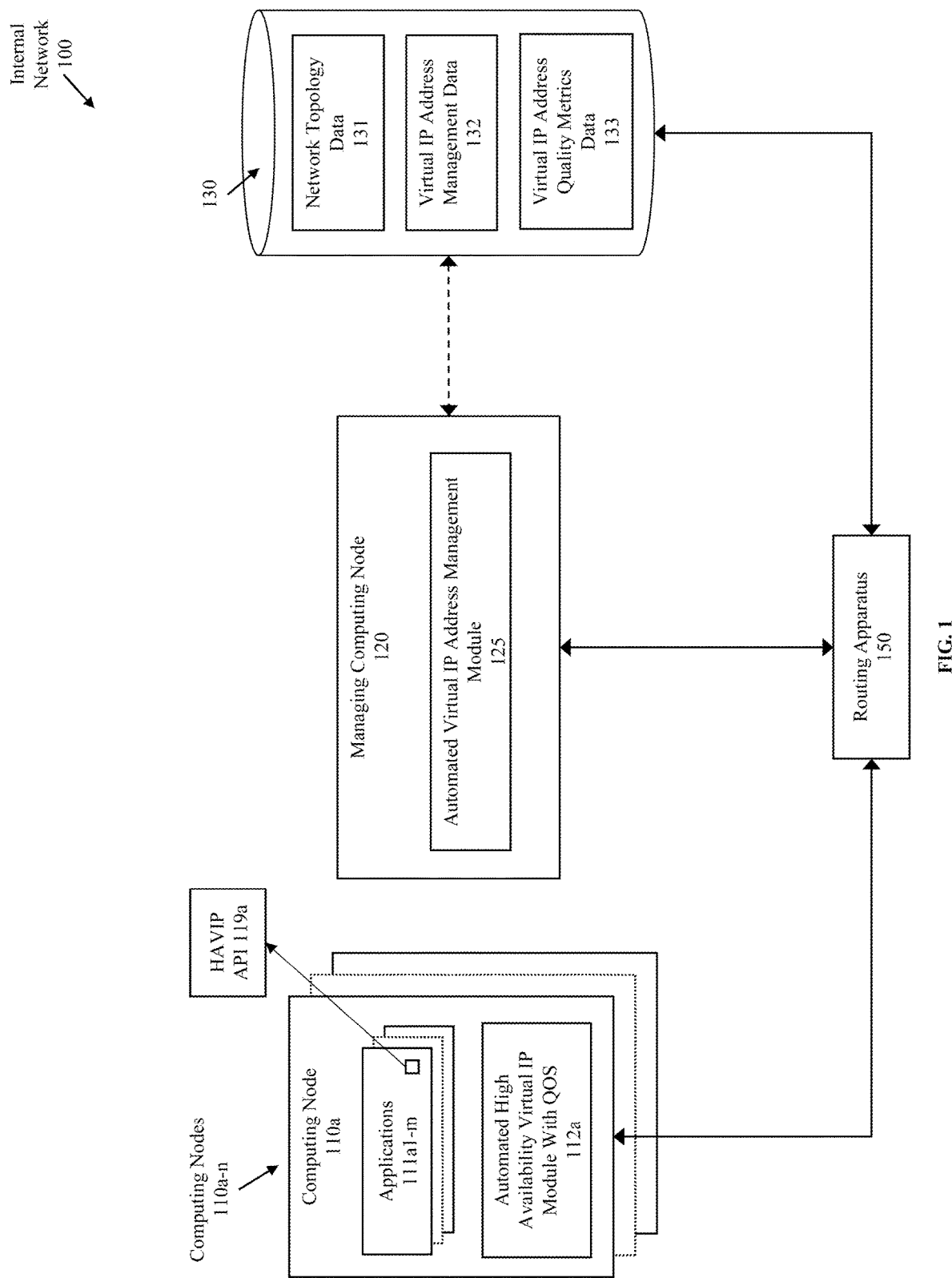
FIG. 1 illustrates a system for providing highly available virtual internet protocol addresses as a configurable service in a cluster according to some embodiments.

FIG. 1 illustrates a system for providing highly available virtual internet protocol addresses as a configurable service in a cluster according to some embodiments. Generally, the configuration service includes a management module at a managing computing node, and a secondary process module at one or more computing nodes that utilize the highly available virtual internet protocol (HAVIP) service.

In some embodiments, the system includes one or more computing nodes 110a-n, a managing computing node 120, and a database 130. The computing nodes 110a-n and the managing computing node 120 may be connected to form an internal network 100. In some embodiments, the managing computing node 120 may comprise a node selected from computing nodes 110a-n. In some embodiments, an additional computing device (not illustrated) interacts with the managing computing node and/or the one or more computing nodes to configure characteristics of the managing computing node 120, such as a range of addresses available for generation of virtual internet protocol (IP) addresses. In some embodiments, multiple computing devices can interact with the managing computing node 120. The computing device comprises any type of computing device that may be used to over a network, whether directly or indirectly.

Examples of such user computing devices include, for example, workstations, personal computers, laptop computers or remote computing terminals. User computing devices may also comprise any type of portable tablet device, including for example, tablet computers, portable readers, etc. A user computing device may also include mobile telephone devices relating to any mobile device that can suitably access any computing systems (e.g., smartphones and programmable mobile handsets). It is noted that the disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, or on a cloud network, etc.

The managing computing node 120 comprises at least an automated virtual IP address management module 125. The characteristics of the management module 125 will be described in further detail below. Briefly, the management module provides for at least capturing network topology information (see e.g., network topology data 131), generation of virtual IP addresses according to a set of rules (see e.g., virtual IP address management data 132), assignment of virtual IP addresses to respective computing nodes (e.g., computing nodes 110a-n), tracking of the assigned virtual IP addresses (see e.g., virtual IP address management data 132). In some embodiments, the managing computing node 120 generates/processes virtual IP quality metrics data for use in determining which virtual IP addresses to assign to respective computing nodes (see e.g., virtual IP address quality metrics data 133). In some embodiments, the automated virtual IP address management module 125, is connected to a network topology routing module that can be used to manage and update how and what devices respective virtual addresses are routed to in order to implement load balancing operations. For example, the routing module could be used to updated entries to change the routing through a network that the data from/to that address is routed in order to utilize devices and connections that would result in greater throughput, lower latency, and/or fewer hops.

In some embodiments, multiple virtual IP addresses are assigned to two or more computing nodes (see computing nodes 110a-n). In some embodiments, each computing node comprises one or more applications and an automated high availability virtual IP module with a quality of service (QOS) aspect. To illustrate, computing node 110a includes one or more applications 111a1-m, and an automated high availability virtual IP module with QOS 112a. Additionally, an application programing interface may be provided for the node, the virtual machine, or the one or more applications (see HAVIP API 119a). In some embodiments, an application (e.g., 111a1), API (e.g., 119a), and automated high availability virtual IP module with QOS 112a interact to provide one or more virtual IP addresses to an application. For example, the application utilizes the API to communication with the automated high availability virtual IP module with QOS 112a to request a virtual IP address. The automated high availability virtual IP module with QOS 112a then either provides/allocates a virtual IP address to the application where that Virtual IP address was already assigned to the node, or requests one or more new virtual IP addresses (using routing apparatus 150) from the management module 125 before identifying a virtual IP address to be provided/allocated to the application.

The routing apparatus 150 provides one or more connections between nodes. The routing apparatus might comprise any combination of wires, switches, routers, firewall appliances, or any other network communication equipment. As a result of the different elements that make up a network, the quality of communications between different computing nodes can vary based on which elements of the network are utilized. This network topology and variance is captured at least in the database 130.

The database 130 includes network topology data 131, virtual IP address management data 132, and virtual IP address quality metrics data 133. This data can be any of data collected from tests at respective computing nodes, from a collection of computing nodes, based on the network topology data 131, or from a combination thereof. In some embodiments, the network topology data 131 comprise a representation of the connections between each device on a network, such that a number of hops between any two locations in the network can be determined. The virtual IP address management data 132 comprise a representation of at least, the virtual IP addresses assigned to respective computing nodes. In some embodiments, the virtual IP address management data includes one or more rules for generating virtual IP addresses and/or for allocating virtual IP addresses. In some embodiments, the virtual IP address quality metrics 133 maintain quality metrics for respective virtual IP addresses on a node-by-node basis. The node-by-node quality metrics are significant here because different virtual IP addresses may perform differently depending on network conditions. For example, a first virtual IP address allocated to a first network interface card and a second virtual IP address allocated to a second network interface card might have different communication characteristics and therefore quality metrics, even if those network interface cards are on the same computing node. Furthermore, routing of communications in a network is generally implemented using routing tables. These routing tables specify the routing of communications to sometimes difference and sometimes the same devices over cables that may or may not be different. As a result, different virtual IP addresses, whether allocated to the same or different network interface cards can have different performance characteristics.

Figure 2:
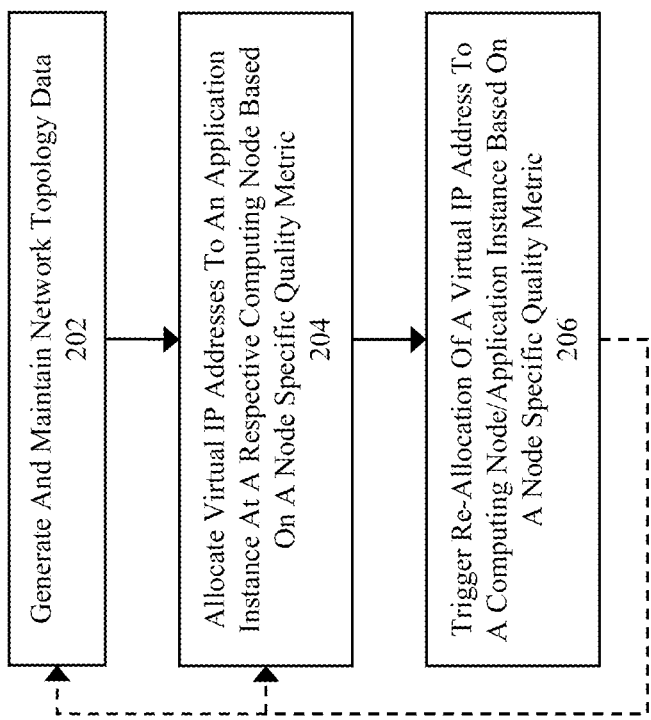
FIG. 2 is a flowchart for providing highly available virtual internet protocol addresses as a configurable service in a cluster according to some embodiments.

FIG. 2 is a flowchart for providing highly available virtual internet protocol addresses as a configurable service in a cluster according to some embodiments. Generally, the process maintains network topology information for use in allocating virtual IP addresses to application instances, and for managing the re-allocation of virtual IP addresses.

Normally, the process starts at 202, where network topology information is generated and maintained. The network topology information may be generated initially in any number of ways and be subsequently updated or supplemented. For example, the network topology may initially comprise a range of IP addresses that are possible on the network, a list of used IP addresses, an identification of each IP address, one or more mac addresses which may also be associated with respective IP addresses, collected by one or more network taps that identify communications over an internal network, or any combination there. For example, if only a range of IP addresses is provided, the managing computing node might generate/supplement that list by pinging each address within that range to determine whether that address is in use and collect connectivity information for each such address. Additionally, the managing computing node might further supplement this information using the automated high availability virtual IP module with QOS on each corresponding computing node to ping each address within the range and to report back any results or directly update the network topology data (see 131). Additionally, on an ongoing basis the managing computing node can utilize any of the above techniques to identify any computing nodes or network devices that join the network.

At 204 virtual IP addresses are allocated to an application instance at a respective computing node based on a node specific quality metric. For example, an application requesting a virtual IP address might identify the computing nodes or IP addresses, virtual or otherwise, with which the application intends to communicate. The process may then assign to a hosting computing node one or more virtual IP addresses of which at least one can then be assigned to the application. In some embodiments, the managing computing node 120 determines which virtual IP addresses to allocate based on available quality metrics. In some embodiments, the computing node with the requesting application applies additional quality metrics to the virtual IP addresses assigned to the computing node, where the additional quality metrics might be generated by the computing node.

In some embodiments, at 206, re-allocation of a virtual IP address to a computing node/application instance is triggered based on a node specific quality metric. This will be discussed further below. Briefly, in the even that a virtual IP address falls below a threshold quality level according to one or more metrics, or otherwise becomes unavailable, a new/different virtual IP address will be assigned to the computing node or application instance.

Figure 3:
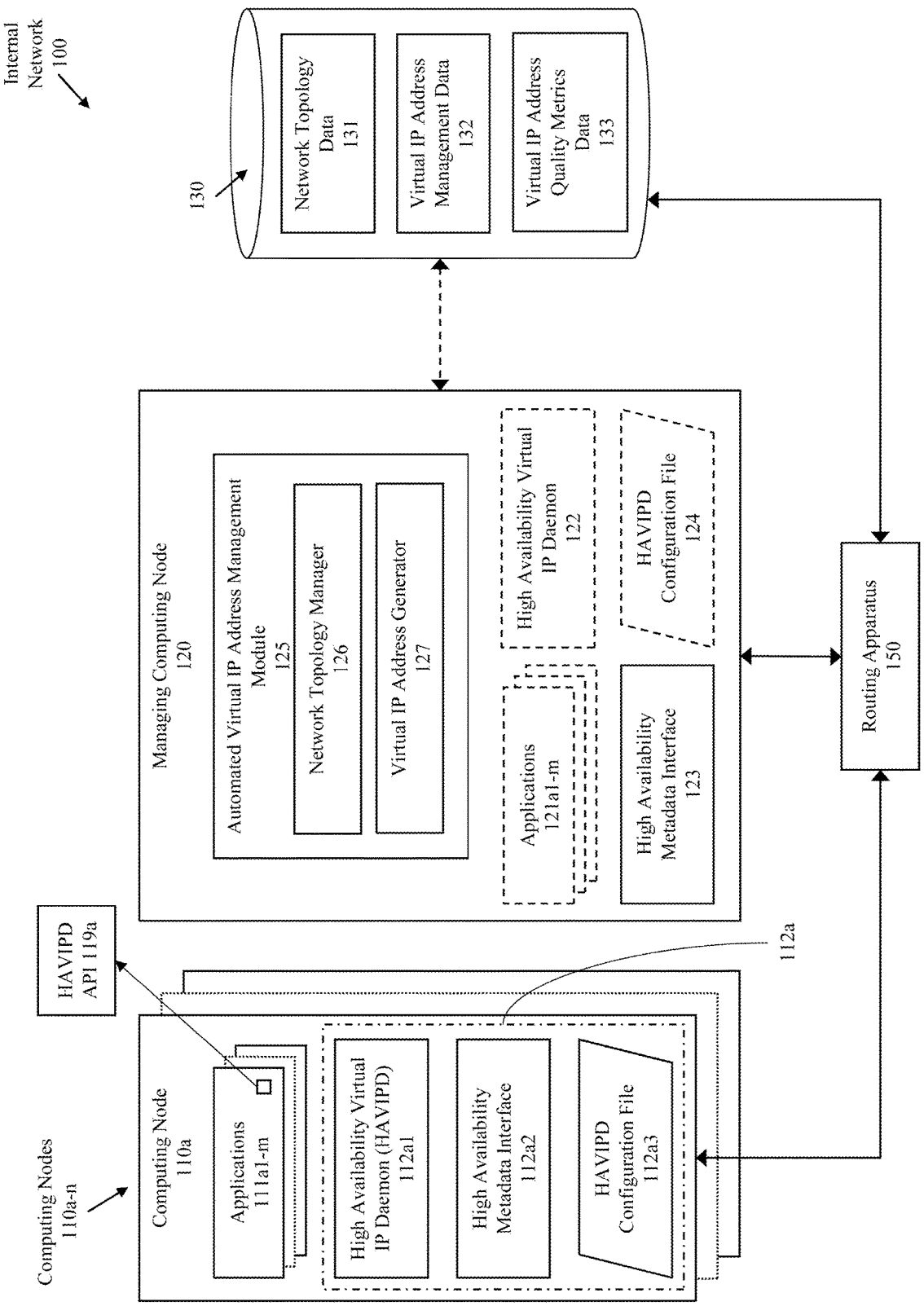
FIG. 3 is a more detailed system for providing highly available virtual internet protocol addresses as a configurable service in a cluster according to some embodiments.

FIG. 3 is a more detailed system for providing highly available virtual internet protocol addresses as a configurable service in a cluster according to some embodiments. Generally, the system illustrated in FIG. 1 and the description thereof is applicable here. However, FIG. 3 adds additional details with regard to the automated high availability virtual IP module with QOS 112a and the managing computing node 120 according to some embodiments. The discussion above regarding like number elements from FIG. 1 are applicable here to like numbered elements in FIG. 3.

In some embodiments, and as illustrated here, the automated high availability virtual IP module with QOS 112a includes the high availability virtual IP daemon (HAVIPD) 112a1, a high availability metadata interface 112a2, and a HAVIPD configuration file 112a3. Each are discussed in turn.

In some embodiments, the HAVIPD 112a1 implements the monitoring and assignment processes. For example, the HAVIPD communicates with central control element to acquire an assignment of one or more virtual IP addresses. In some embodiments, the HAVIPD also assigns virtual IP addresses based on quality metrics to one or more requesting applications in response to a request from an HAVIPD API (see e.g., 119a). Furthermore, in some embodiments, the HAVIPD can also monitor virtual IP addresses for issue and can report statistics about virtual IP addresses to maintain quality metrics. For instance, the HAVIPD might monitor a network interface card to detect any issues with the network interface card and report such issues to the automated virtual IP address management module, and take one or more actions to assign a virtual IP address to another network interface card at the same computing node. Additionally, the HAVIPD may periodically collect and transmit or store quality metrics for virtual IP addresses assigned to a node, including both in use virtual IP addresses and reserved or assigned but not in use virtual IP addresses.

In some embodiments, the high availability metadata interface 112a2 replicates metadata at least for the computing node on which it is located. This information can comprise any combination of the virtual IP addresses in use by corresponding applications on the computing node, the virtual IP addresses assigned to the computing node, whether a virtual IP address is in use or not in use, the network interface cards that can exchange communications using each virtual IP address, the quality metrics associated with the relevant virtual IP addresses, or duplicate network topology information. In this way, each computing node contains sufficient information to become a managing computing node (if a current managing computing node fails) or to provide relevant information to a new managing computing node.

In some embodiments, an HAVIPD configuration file 112a3 is provided. The configuration file may comprise any combination of whether the computing node is a managing computing node, which of virtual IP address(es) are assigned to the computing node, which assigned virtual IP address(es) are in use by which application(s), whether any virtual IP addresses assigned are exclusively or non-exclusively used by the computing node or application, managing computing node election rules, etc. In some embodiments, non-exclusive use is permitted when the non-exclusively used virtual IP address is used in multiple clusters or networks that are managed by the same automated virtual IP address management module 125. Furthermore, in some embodiments, a firewall or network boundary device is used physical/logically between networks/clusters that translates network addresses as appropriate.

In some embodiments, the managing computing node 120 also includes one or more applications (121a1-m), a high availability virtual IP daemon 122, a high availability metadata interface 123, and a HAVIPD configuration file 124 similar to any of computing nodes 110a-n (see e.g., 111a1-m, 112a1, 112a2, 112a3) to utilize the automated virtual IP address management features. Additionally, in some embodiments, the automated virtual IP address management module comprises a network topology manger 126 and a virtual IP address generator 127.

The network topology manager 126 tracks the relevant network topology. For example, the network topology manager might include information representing each computing node (including any network interface cards on each node) within the network and each virtual IP address assigned to each application and the corresponding network interface card that is configured to receive communications for said virtual IP address. Additionally, the network topology manager may also track any virtual IP addresses available for assignment within the network. In some embodiments, the network topology manager 126 stores network topology information in a network connected storage location such as network topology data 131, and virtual IP address assignment data in virtual IP address management data 132.

The virtual IP address generator 127 generates one or more virtual IP addresses for assignment to one or more computing nodes and/or to one or more applications. For example, the virtual IP address generator 127 may generate addresses based on one or more address generation rules in the virtual IP address management data 132. In some embodiments, a plurality of virtual IP addresses are generated at an initial configuration phased. In some embodiments, virtual IP addresses are generated in response to requests from respective computing nodes. For instance, when a computing node requests a virtual IP address a specified number of addresses are generated (e.g., three addresses per request, or a number specified in the request). The virtual IP addresses may be generated at random, sequentially, based on a hash, or using any other relevant method. In some embodiments, one or more virtual IP addresses may be associated with one or more quality metrics.

Figure 4:
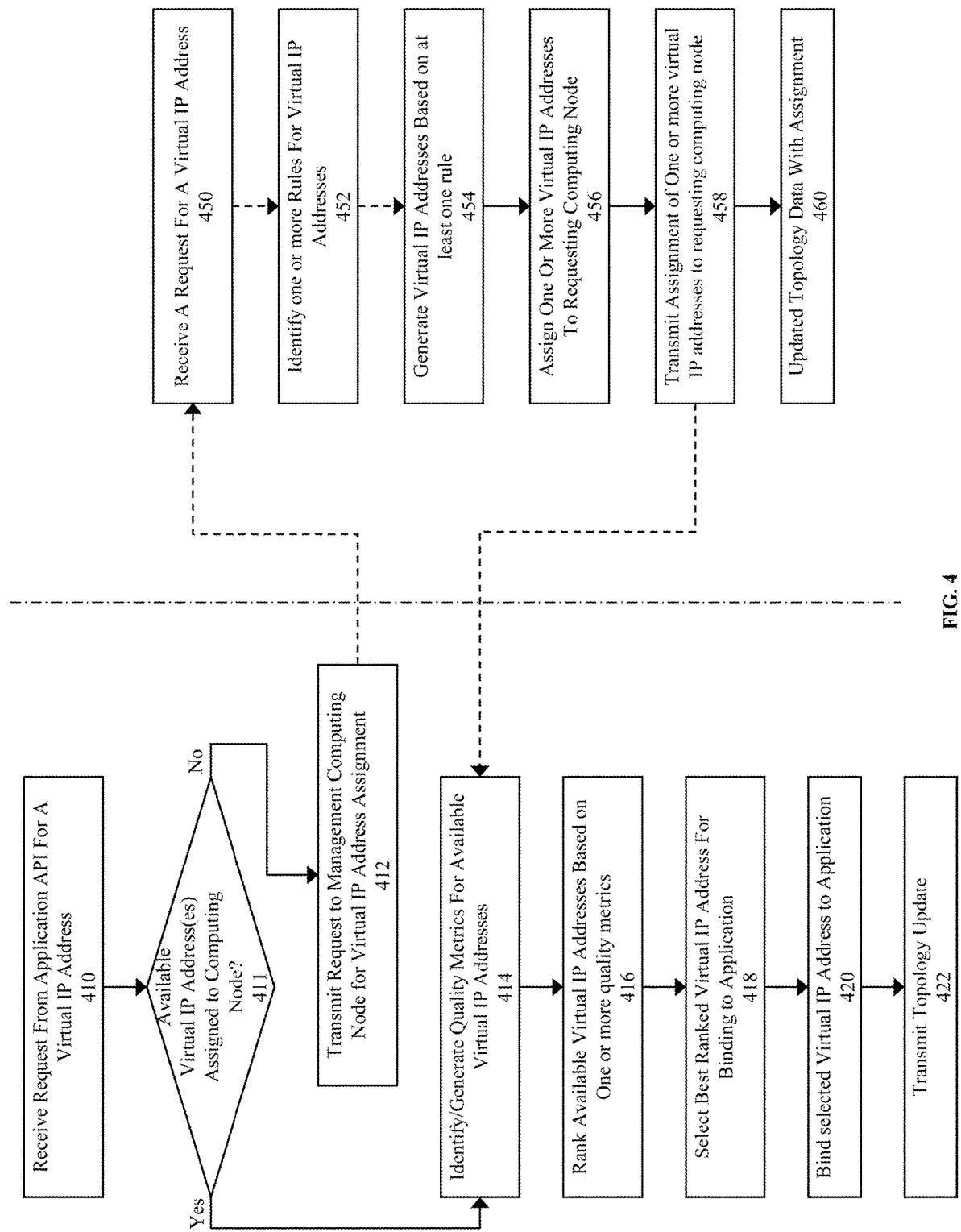
FIG. 4 illustrates an example flow for allocating virtual IP addresses to an application instance at a respective computing node based on a node specific quality metric according to some embodiments.

FIG. 4 illustrates an example flow for allocating virtual IP addresses to an application instance at a respective computing node based on a node specific quality metric according to some embodiments. Generally, FIG. 4 illustrates interactions between a requesting computing node (on the left of the dotted and dashed line), and a managing computing node (on the right of the dotted and dashed line).

In some embodiments, the process starts at 410 when a request is received from an application API for a virtual IP address. For example, a computing node having an application that supports virtual IP addresses via the API (e.g., 119a) transmits a request to an HAVIPD for a virtual IP address. In some embodiments, that request also specifies which IP addresses (virtual or otherwise) the application is expected to communicate with using the to be assigned virtual IP address. In some embodiments, the request also specifies whether the virtual IP address is to be exclusively assigned to the application.

In some embodiments, after a request is received at 410 a determination is made as to whether there are any available virtual IP addresses already assigned to the computing node. If there are already available virtual IP addresses at the computing node the process may proceed at the computing node (see 414) without waiting for an operation at the management computing node. As disclosed herein, the highest availability for virtual IP addresses is obtained when computing nodes that participate in the virtual IP address arrangement disclosed herein have additional virtual IP addresses available for quick assignment to requesting applications. In some embodiments, a virtual IP address may not be available for assignment at the computing node.

At 412, a request is transmitted to a managing computing node for a virtual IP address assignment. For instance, if it is determined that no available virtual IP addresses are available (or less than a threshold number) to satisfy the request from the application, the process may transmit a request to the managing computing node for an assignment of one or more virtual IP addresses. Furthermore, in some embodiments, when a request for a virtual IP address is received such as at 410, a request is sent at 412 even if there is an available virtual IP address to replenish a set of virtual IP addresses maintained for binding to applications at the computing node. For example, as part of an initial setup processes, each participating computing node may request a number of virtual IP addresses (e.g., 1, 2, 3, etc.) corresponding to a configuration rule (e.g., a rule specifying the number of available virtual IP addresses to be maintained at each computing node for redundancy/availability). Subsequently, whenever a request is received from an application on a respective computing node, that computing node also requests a replacement virtual IP address to replenish the set of available addresses. The processes of the managing computing node are discussed below after the discussion of the process of the requesting computing node that follows immediately here. In some embodiments, the number of addresses allocated (in addition to those discussed above) may also depend, at least in part, on the frequency of requests for additional virtual IP addresses, a number of available/unallocated addresses within the network, and a maximum number of virtual IP addresses in the network.

Quality metrics for corresponding virtual IP addresses are analyzed at the computing node. The computing node at the time of the operation(s) of 414 is associated with one or more virtual IP addresses that correspond to the request from the application, whether already assigned to the computing node at the time of the request from the application or whether assigned to the computing after said request, or some combination thereof. Quality metrics might comprise at least one of the following: ping statistics between the requesting computing node and one or more end points, a number of hops between the requesting computing node and one or more end points, or a data loss rate whether in the aggregate for all end points identified or for the one or more end points. In some embodiments, the quality metrics where previously generated. In some embodiments, the quality metrics are generated by pinging respective end points, identifying the number of hops for each connection, and/or determining a data loss rate using a set of test packets or using a previously determined value (e.g., average data loss rate).

At 416, the available virtual IP addresses are ranked based on at least one corresponding quality metric. For example, a ranking may be based on a single quality metric for the identified end points (e.g., ping as embodied in round trip latency, number of hops, or data loss rate). Alternatively, a ranking may be based on multiple quality metric for the identified end points (e.g., a combination of at least two of the following: ping as embodied in round trip latency, number of hops, data loss rate). In some embodiments, each quality metric may be modified by a weighting factor before being combined to generate a final rank. For example, a rank for a virtual IP address may be determined by the following: Rank=$w_l*1/n_l+w_h*1/n_h+w_e*p_e$, where $w_l$, $w_h$, and we are the weights applied to the latency, number of hops, and error rate respectively, and where $n_l$ is the latency number, $n_h$ is the number of hops, and pc is the percentage error rate. In some embodiments, the weights can be changed by a user and/or a user could define a custom ranking formula include one or more custom quality metrics. Once the ranking is generated, a best ranking (e.g., highest or lowest) virtual IP address can be selected at 418 and bound to the requesting application at 420. Additionally, in some embodiments, the selection and/or binding of a virtual IP address to the application can be reflected in the network topology data at 422 by transmitting one or more messages to a managing computing node for entry into the network topology data or by updating the network topology data directly by the requesting computing node.

In some embodiments, a request for a virtual IP address assignment is received at 450. This request might comprise a request for a virtual IP address including a number of virtual IP addresses requested and/or whether those virtual IP addresses are to be assigned exclusively to a single application. In some embodiments, at 452, one or more rules for virtual IP address generation/identification are identified and used to generate or identify virtual IP addresses at 454 based on those one or more rules. For instance, one or more random addresses are generated within a range of possible addresses by an address generation module, and subsequently analyzed to determine if they meet all the necessary conditions as specified by the one or more rules. For example, after a virtual IP address is generated it might be processed with a first rule to ensure that it is within an allowed address range, and a second rule to ensure that it is not already exclusively assigned to a computing node, and a third rule to verify that it is not already in non-exclusive use when a corresponding request is for a virtual IP address exclusively for use by the requesting computing node. In some embodiments, the one or more virtual IP addresses are analyzed using one or more thresholds or flags. For example, if a generated virtual IP address was previously assigned to the requesting computing node and that computing node previously replaced that virtual IP address, a flag might be raised in the node topology data specifying that said virtual IP address should not be assigned to that same computing node again (or at least until the flag expires or is removed). In some embodiments, that flag might remain raised until a user, a time period, one or more conditions, or some combination thereof occurs.

After the one or more virtual IP addresses are generated the processes may assign one or more of those addresses to the requesting computing node at 456. For example, one or more virtual IP addresses are assigned to the requesting computing node at 456 based on their order and/or existence within a data structure. After the managing computing node assigns the one or more virtual IP addresses to the requesting computing node, information representing that assignment is transmitted to the requesting computing node at 458, and network topology data is updated at 460 to reflect the assignment of those virtual IP addresses to said requesting computing node. In some embodiments, the network topology data also indicates whether the assignment is exclusive for respective virtual IP addresses.

FIGS. 5A-5B illustrate example flows for re-ranking/re-allocation of one or more virtual IP addresses to one or more application instances based on a node specific quality metric according to some embodiments.

FIG. 5A illustrates an example flow for updating ranking information for a respective computing node and one or more application instances based on a node specific quality metric according to some embodiments.

For example, the process may start at 511 where a determination is made as to whether one or more virtual IP address ranks should be updated. For example, the process might be triggered by a user, based on a timeliness factor (e.g., at a present interval, based on expiration of a timer, or based on a time since a last ranking was generated), based on a change in network topology (e.g., the addition or removal of one or more devices/endpoints/virtual IP addresses/physical IP addresses—or a threshold amount thereof—to the network as reflected in the network topology data), based on a change in the end points a corresponding application communicates with, or based on a change in a relevant quality metric (e.g., a change in the latency to one or more end points, a change in the number of hops to one or more end points to any endpoints or only to endpoints associated with a respective virtual IP address, a change in a data loss rate, or a change greater than a respective threshold for any of the latency, number of hops, or data loss rate), or any combination thereof. If the determination is that the ranks should not be updated the process waits for a subsequent trigger.

In the event, that a determination is made that the ranks of one or more virtual IP addresses should be updated then the process proceeds at 514 to identify relevant quality metrics and at 516 to rank the one or more virtual IP addresses using the relevant quality metrics. The operations of 514 and 516 are largely equivalent to 414 and 416 respectively as discussed above. However, whereas 414 and 416 generated ranks in response to a single request from an application for a new virtual IP address assignment, and thus normally only generate ranks for the requesting application, the processes for 514 and 515 are normally applied to each respective virtual IP address bound to each application at the computing node and for each available virtual IP address at the computing node. Therefore, for each virtual IP address already assigned to a respective application, the relevant endpoints are identified, and all virtual IP addresses allocated to the computing node (whether already bound to an application or not) are evaluated and ranked for the purpose of potentially replacing/re-assigning a bound address for that particular computing node.

FIG. 5B illustrates an example flow for re-allocation of one or more virtual IP addresses to an application instance based on available ranking information for a respective computing node and one or more application instances based on a node specific quality metric according to some embodiments.

In some embodiments, the process starts at 561 where a determination is made as to whether re-allocation should occur. For example, re-allocation may occur in response to a user input, based on one or more quality metrics that exceed a threshold (e.g., a latency is too high, a number of hops is too great, a data loss rate is too high) for one or more virtual IP addresses bound to one or more applications, or based on a ranking or aggregate ranking of one or more virtual IP addresses being outside of a threshold number of corresponding best ranked virtual IP addresses. If the determination is to re-allocate one or more virtual IP addresses, the process proceeds to 518. However, if the determination is not to re-allocate one or more virtual IP addresses the process waits until a triggering condition is met to again determine if one or more virtual IP addresses should be re-allocated.

In some embodiments, the process proceeds to 518 where the best ranked virtual IP address(es) are selected for binding similar to the approach discussed above in regard to 418. In some embodiments, each virtual IP address is considered separately by selecting the best ranked virtual IP address of all available but not bound virtual IP addresses or all virtual IP addresses allocated to the computing node. In some embodiments, the virtual IP addresses are assigned to applications in an order of priority specified by an administrator, according to one or more rules, or some combination thereof. In some embodiments, all virtual IP addresses allocated to computing node are evaluated together to select best ranked virtual IP addresses as a set of virtual IP addresses with corresponding assignments. For example, if there are three virtual IP addresses to be assigned to three different applications then the assignment of respective virtual IP addresses is performed such that a best aggregate rank is achieved. One approach to achieve this might comprise identifying the number of virtual IP addresses to be assigned and generating a ranking for each possible combination of assignments of the same number of virtual IP addresses, where the combination with the best aggregate ranking is selected. Additionally, in the event that multiple aggregate rankings are the same or within a threshold, a combination that causes the least number of re-assignments may be selected.

At 520 any changes identified based on the selection from 518 are implemented by binding, possibly after unbinding, the selected virtual IP address(es) to the corresponding applications. Finally, any changes are then reflected in the network topology data at 422 as discussed above.

Figure 6A:
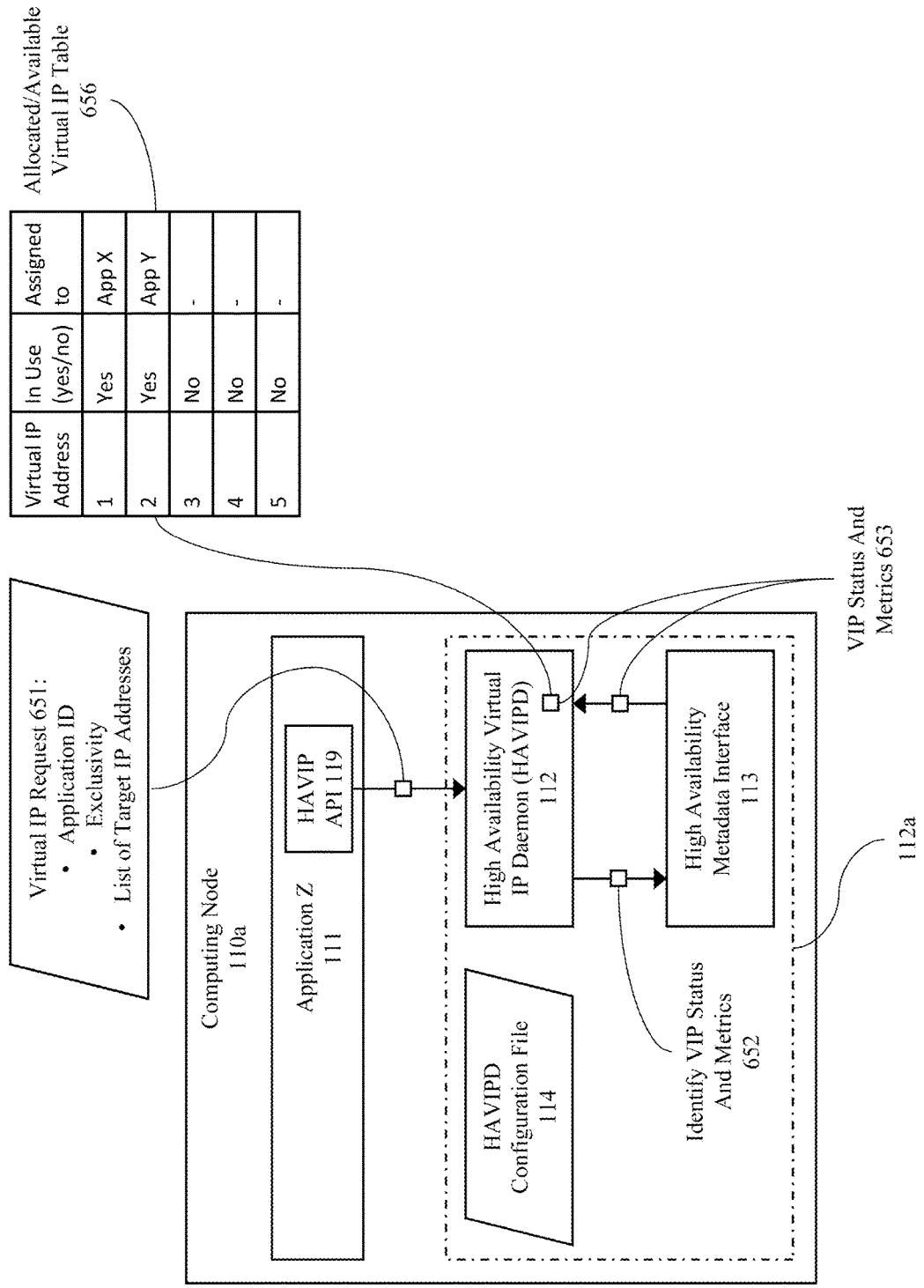
FIGS. 6A-6B provide an example illustration of a process to identify a best ranking virtual IP address to bind to an application according to some embodiments.
Figure 6B:
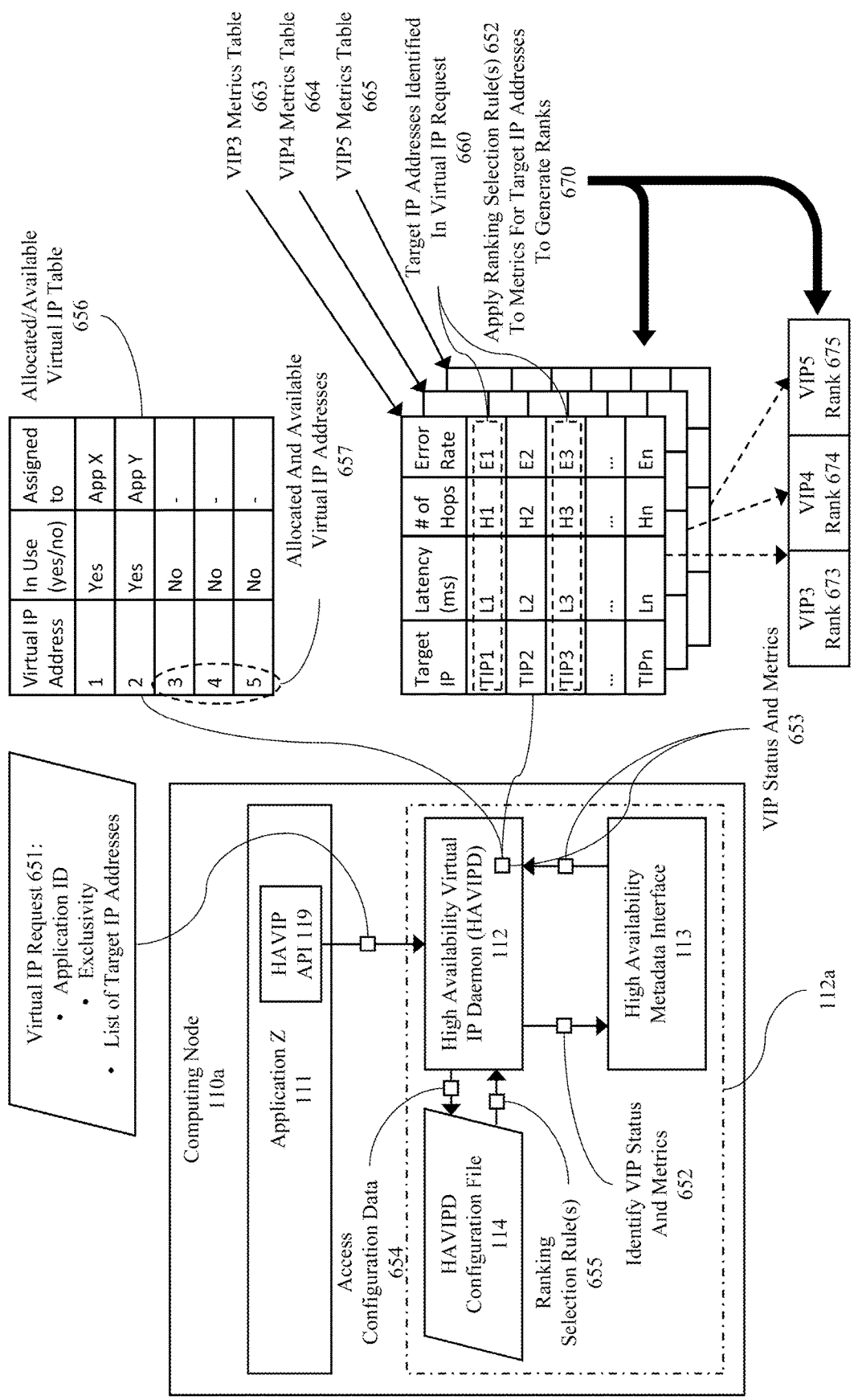

FIGS. 6A-6B provide an example illustration of a process to identify a best ranking virtual IP address to bind to an application according to some embodiments. The approach illustrated here, operates on virtual IP addresses that have already been allocated to the computing node. However, this could be extended to include additional addresses received and/or requested from a managing computing node. The approach illustrated here is only one approach and different approaches could be implemented. Additionally, as illustrated here computing node 110a includes elements previously discussed in this document, and that discussion applies here where applicable.

FIG. 6A illustrates the portion of the approach to the point of identification of virtual IP addresses available for allocation.

The processes starts when an application transmits a request for virtual IP address. For example, an application (application Z see 111) transmits a virtual IP request (see 651) using a HAVIP API (see 119). The virtual IP request might comprise any combination of an application ID, whether the virtual IP address request is for a virtual IP address to be exclusively used by the application, or a list of one or more target IP addresses to be communicated with using the virtual IP address to be bound to the application. The request is received by the high availability virtual IP daemon 112 which is discussed earlier in this document and may be part of an automated high availability virtual IP module with QOS element 112a.

In response to receiving the virtual IP request 651, the HAVIPD 112 triggers the identification of virtual IP (VIP) status and metrics 652 against the high availability metadata interface 113, which returns virtual IP status and metrics 653 to the HAVIPD. At least part of the VIP status and metrics 653 comprises an allocated and/or available virtual IP table 656 (VIP table). The VIP table comprises multiple columns representing different information. For example, the first column comprises virtual IP addresses allocated to the computing node, the second column specifies whether the corresponding virtual IP address in the first column is in use by the computing node, and the third column specifies the application that an in use virtual IP address in the same row is allocated to. For example, VIP table 656 indicated that virtual IP address 1 is assigned App X and virtual IP address 2 is assigned App Y, whereas virtual IP addresses 3, 4, and 5 are not in use by the computing node or assigned to an application.

FIG. 6B illustrates the portion of the approach continuing from FIG. 6A to identify and rank metrics to determine which available virtual IP address should be bound to the requesting application.

The process continues at 654 where the configuration data is accessed (see HAVIPD configuration file 114 discussed elsewhere herein). This information comprises one or more ranking selection rules 655. For example, rules might specify that when an application requests a virtual IP address that the application can be assigned a virtual address already allocated to the computing node e.g., if there are at least 3 virtual IP addresses that are not already bound to an application. As illustrated here, at 657 there are three virtual IP addresses available for binding to the application. Additionally, for the purpose of this example we assume that a rule specifies that only virtual IP addresses that are not already bound/assigned to an application can be considered in response to a new virtual IP request (e.g., 651).

Here, the virtual IP addresses that are considered for allocation are VIP3, VIP4, and VIP5. Each virtual IP address is associated with a set of metrics which can be represented by a corresponding table in relation to target IP addresses within a system (see 663, 664, and 665). Specifically, each table will identify one or more target IP addresses and communication metrics applicable to the associated virtual IP address. For example, VIP3 has a metric table 663 that includes target IP addresses in the first column (TIP1-TIPn), latency values for communications to those target addresses using the virtual IP address (e.g., round trip latency for communication with TIP1 using VIP3) in a second column, a number of hops to reach the corresponding target address using the virtual IP address (e.g., round trip latency for communication with TIP1 using VIP3) in a third column, and a corresponding error rate in the fourth column. Thus the metrics in a single row are for the target IP address in the same row. Similarly, VIP4 and VIP5 will have similar tables but may have different values (see 664 and 665 respectively).

Once the metric data is identified a subset thereof may be selected to generate a rank(s) each respective virtual IP address. For example, as illustrated at 660, the virtual IP request 652 identified two target IP addresses to be communicated with using the to be bound virtual IP address (see 660). Thus, using the rules, a rank can be generated for each of the virtual IP address identified (see VIP rank 673, 674, and 675) based on a formula specified by the ranking selection rule(s) 655. As illustrated here, the rank for each virtual IP address might be generated by generating a ranking component for each target address and respective virtual IP address and then adding together those component rankings as applicable to form a given VIP ranking (see 670). Once the ranks are generated the best ranking virtual IP address can be identified and bound to the application Z.

Figure 7A:
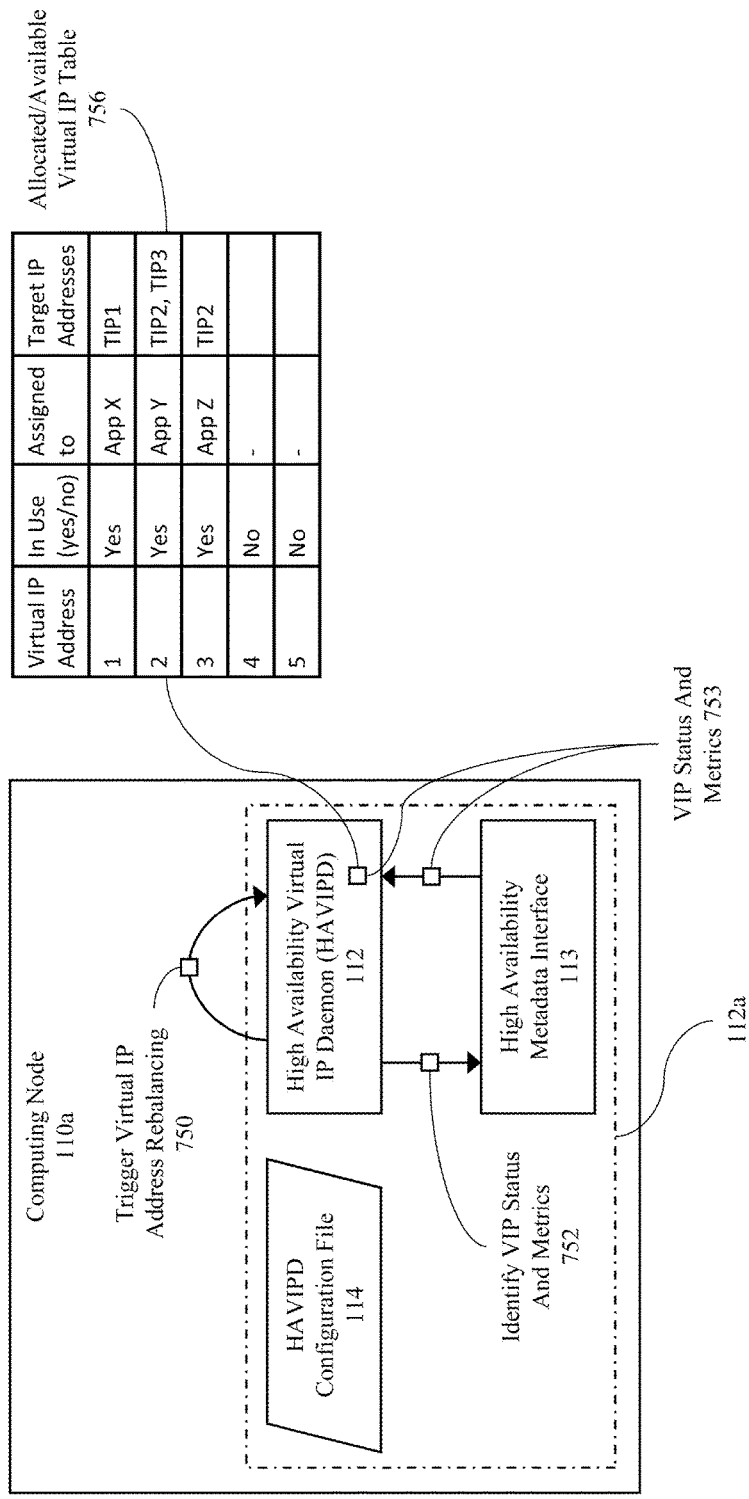
FIGS. 7A-7C provide an example illustration of a process identify a combination of best ranking virtual IP addresses to bind to respective applications according to some embodiments.
Figure 7B:
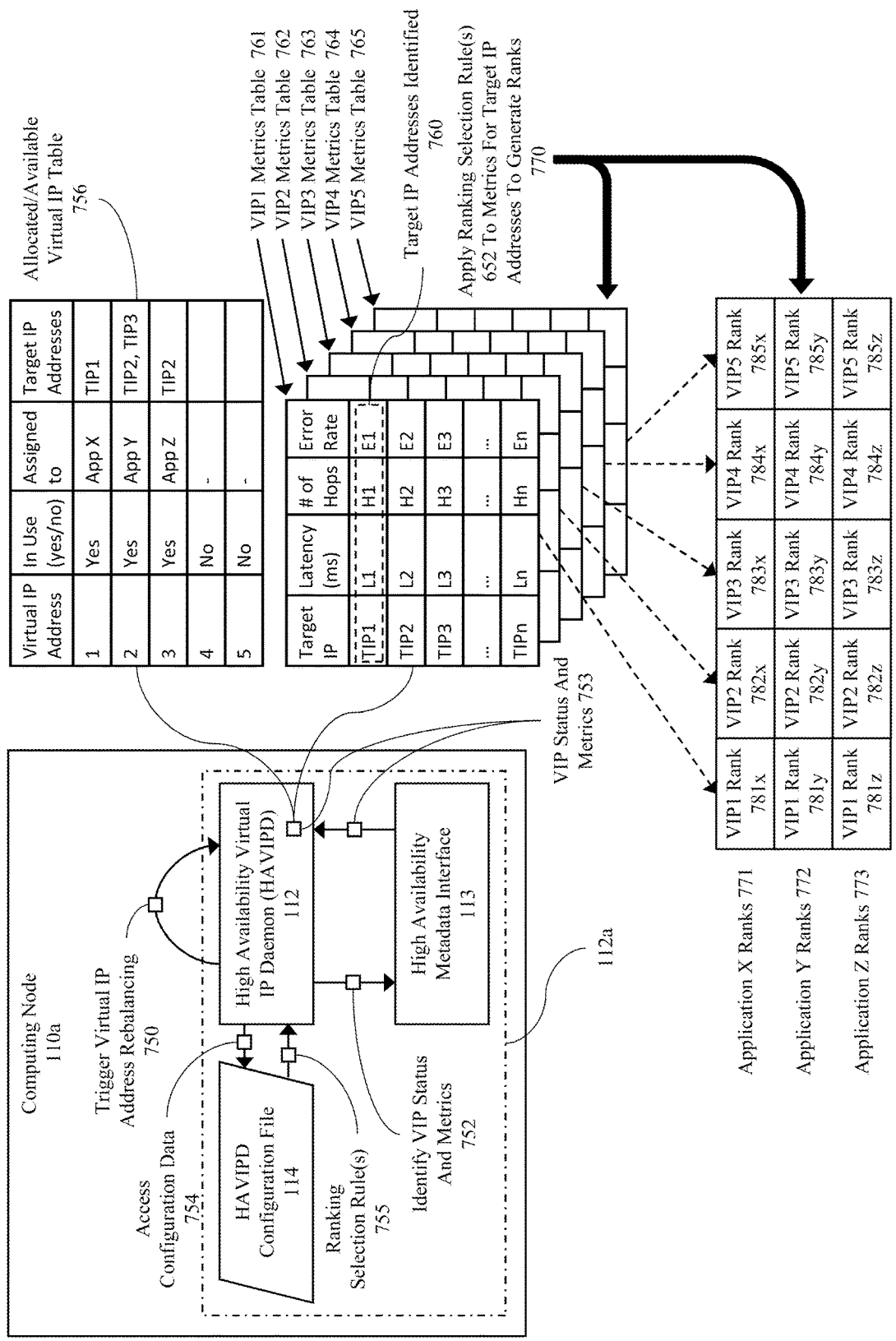
Figure 7C:
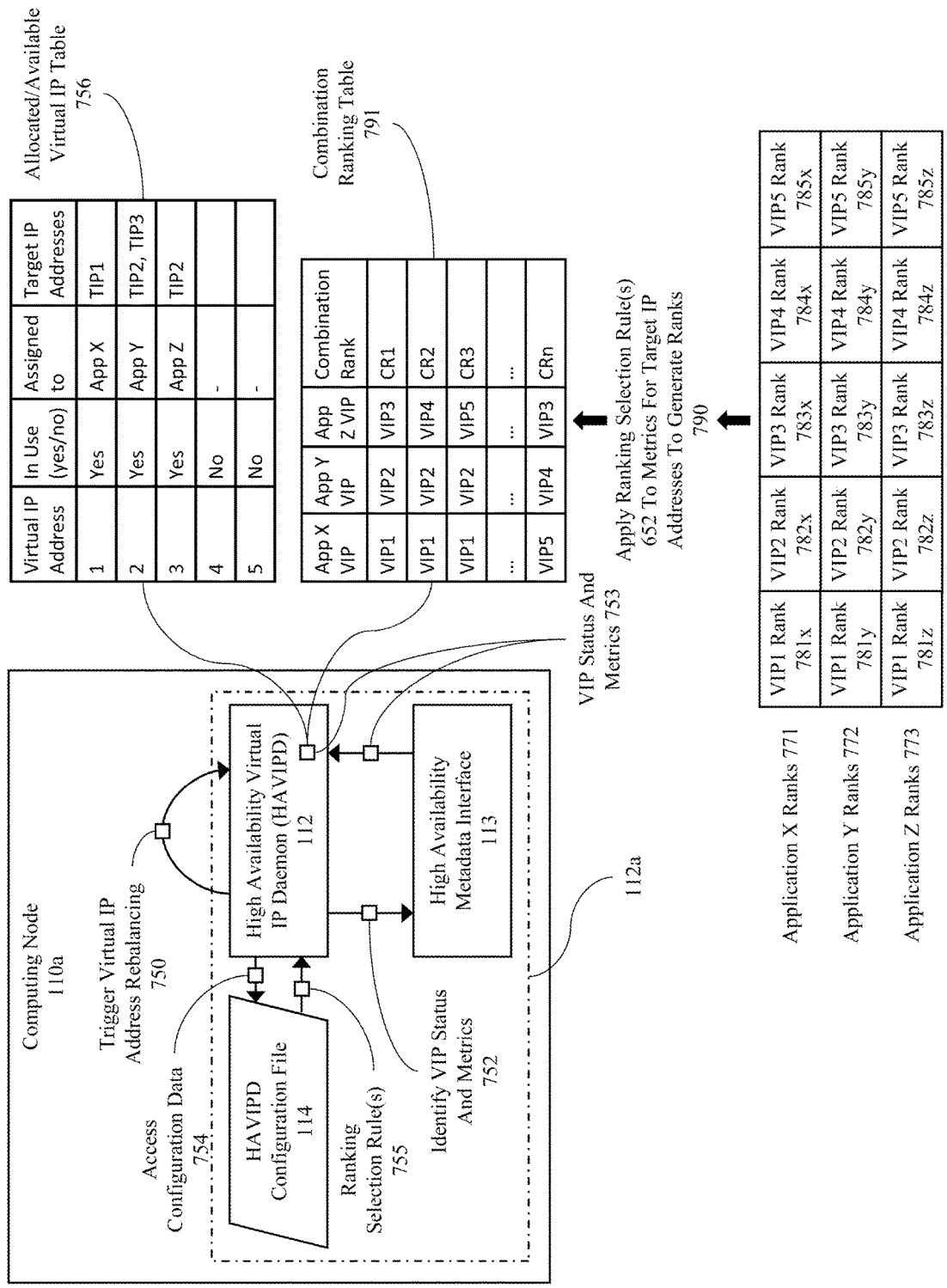

FIGS. 7A-7C provide an example illustration of a process to identify a combination of best ranking virtual IP addresses to bind to respective applications according to some embodiments. The approach illustrated here, operates on at least virtual IP addresses that have already been allocated to the computing node. However, this could be extended to include additional addresses received and/or requested from a managing computing node. The approach illustrated here is only one approach and different approaches could be implemented. Additionally, as illustrated here computing node 110a includes elements previously discussed in this document, and that discussion applies here where applicable.

FIG. 7A provides an example illustration of identification of virtual IP addresses bound or that could be bound to respective applications according to some embodiments.

The process generally starts in response to a triggering event. For example, rebalancing could be triggered at 750 according to the determination discussed in FIG. 5B (see item 561). In response to the trigger (see 750) the high availability virtual IP daemon (HAVIPD) 112 (discussed earlier herein). Once triggered the process will identify VIP status and metrics at 752 (similar to 652) which are provided at 753 (similar to 653) from the high availability metadata interface 113. However, here the allocated/available virtual IP table 756 includes an additional column with respect to the corresponding table in FIG. 6A-6B (see 656). Specifically, table 756 includes a list of target IP addresses within corresponding rows and columns. This information could be initially identified from a virtual IP address request (see 651), based on one or more addresses communicated with, or some combination thereof.

FIG. 7B provides an example illustration of identification of an approach to generate rankings for each virtual IP address for each application.

The ranking process begins by identifying the corresponding target IP address(es) and metrics for a given application. To illustrate, metrics tables 761-765 for VIP1-VIP5 are identifies and then rows are selected that match the target IP addresses from the virtual IP table 756. In the case of Application X TIP1 is identified (see 760) and a rank is generated for each table of tables 761-765 (which each correspond to a single virtual IP address). As illustrated the rank for each address with regard to Application X is based on the rank for TIP1 which is generated as discussed above based on any one or more metrics from the corresponding metrics tables (see 761-765). These ranks can be captured as 781x-785x (see 770). Similarly, ranks for the other applications can be generated. However, whereas Application X is associated with a single target IP address, Application Y is associated with two target IP addresses (TIP2 and TIP3), the ranks for a virtual IP address associated with multiple targets can comprise an average of respective ranks for each target associated with the virtual IP address. As illustrated here, each application is associated with a rank for each virtual IP address (see 781x-785x, 781y-781y, and 781z-785z).

FIG. 7C provides an example illustration of identification of an approach to generate combined rankings for the set of application according to some embodiments.

In the present example, each application (X, Y, and Z) is to be exclusively assigned a single virtual IP address. Thus, each combination of three virtual IP addresses to any combination of the three applications may be associated with a combined rank (see 790 and 791). This is illustrated at 791 where the first row specifies assigning VIP1 to application X, VIP2 to application Y, VIP3 to application Z, and CR1 represents the combined ranking. Additionally, other combinations and assignments are illustrated in other rows of the combined ranking table. In some embodiments, each combined ranking is the sum of each Application to virtual IP address ranking. Thus, CR1 would equal the ranking for assigning VIP1 to Application X, VIP2 to Application Y, and VIP3 to Application Z, with rankings for other combinations being generated in a similar manner. In this way, a highest-ranking combination can be identified. In some embodiments, the rankings may be modified based a number of changes that would be required to achieve a corresponding reassignment. Furthermore, if no combined ranking is beyond a threshold amount greater than the ranking for the currently virtual IP address assignments, the process may be aborted without changing assignments.

System Architecture

Figure 8:
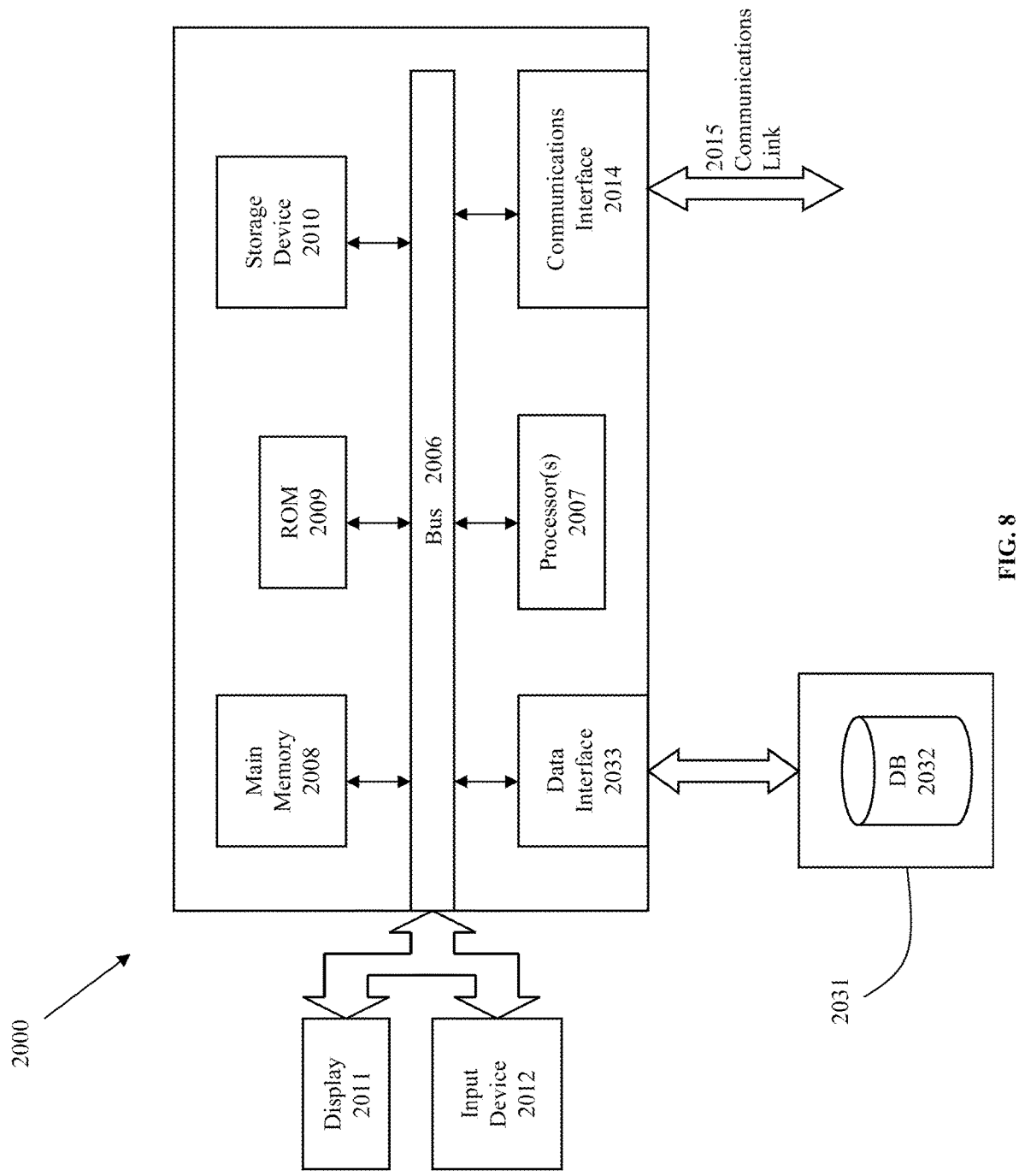
FIG. 8 is a diagram of a computing system suitable for implementing an embodiment of the present disclosure.

FIG. 8 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 9:
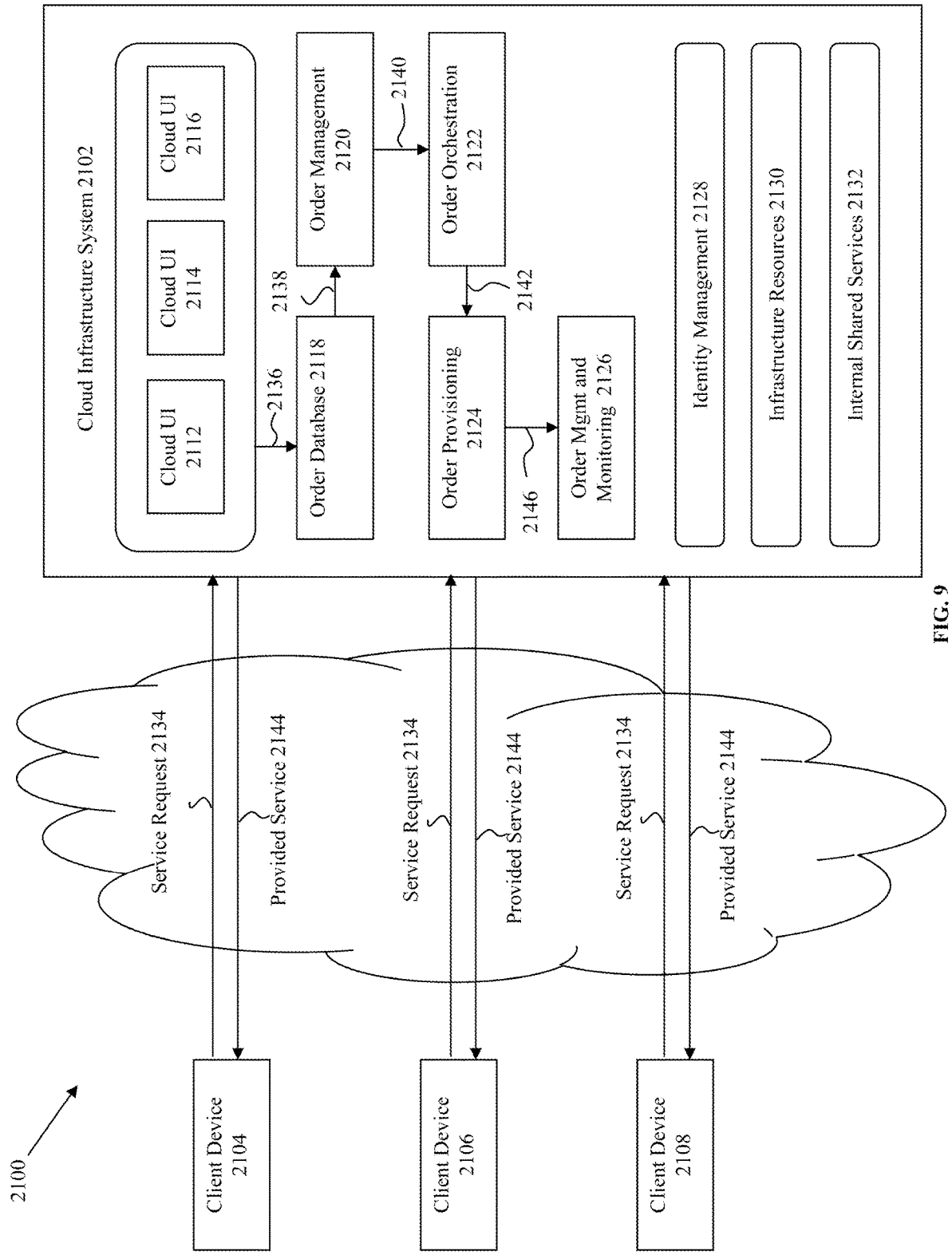
FIG. 9 is a block diagram of one or more components of a system environment in which services may be offered as cloud services, in accordance with an embodiment of the present invention.

FIG. 9 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 7. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for highly available virtual internet protocol addresses as a configurable service in a cluster addresses at least some of the issues of prior techniques suffer from, by providing both high availability and mobility of IP addresses using virtual IP addresses.

What is claimed is:

1. A computer-implemented method comprising:
identifying computing node specific quality metrics data for respective computing nodes of a plurality of computing nodes, wherein the computing node specific quality metrics data comprises at least a first set of metrics for a first computing node, the first set of metrics representing characteristics of communications between first one or more respective virtual internet protocol (IP) addresses allocated to the first computing node and second one or more respective virtual IP addresses allocated to one or more other computing nodes; and
binding a virtual IP address of the first one or more respective virtual IP addresses allocated to the first computing node to an application instance at the first computing node of the respective computing nodes based on the first set of metrics for the first computing node.

2. The method of claim 1, wherein network topology data corresponding to at least the plurality of computing nodes is maintained, and the network topology data is updated to reflect the binding of the virtual IP address to the application instance.

3. The method of claim 1, wherein the computing node specific quality metrics data comprises at least one of a latency, a number of hops, and an error rate associated with different target IP addresses.

4. The method of claim 1, wherein a managing computing node previously generated the virtual IP address and assigned the virtual IP address to the first computing node.

5. The method of claim 1, wherein multiple computing nodes manage allocation of respective virtual IP addresses to respective application instances at respective ones of the plurality of computing nodes.

6. The method of claim 1, wherein allocating the virtual IP address to the application instance at the first computing node based on the computing node specific quality metrics data comprises at least ranking multiple virtual IP addresses assigned to the first computing node based on quality metrics data corresponding to target IP addresses to be communicated with using the virtual IP address and selecting a best ranking virtual IP address as the virtual IP address to be allocated to the application instance.

7. The method of claim 1, wherein the virtual IP address is re-allocated to a different application after a reallocation process is triggered.

8. The method of claim 7, wherein the reallocation process allocates respective virtual IP addresses based on a combination of multiple rankings corresponding to multiple virtual IP address allocations at a respective computing node.

9. The method of claim 1, wherein a high availability virtual IP daemon, a high availability metadata interface, and a high availability configuration file are maintained at two or more computing nodes that allocate respective virtual IP addresses, and the two or more computing nodes are within a same cluster.

10. A non-transitory computer readable medium having stored thereon a sequence of instructions which, when executed by a processor causes a set of acts comprising:
identifying computing node specific quality metrics data for respective computing nodes of a plurality of computing nodes, wherein the computing node specific quality metrics data comprises at least a first set of metrics for a first computing node, the first set of metrics representing characteristics of communications between first one or more respective virtual internet protocol (IP) addresses allocated to the first computing node and second one or more respective virtual IP addresses allocated to one or more other computing nodes; and
binding a virtual IP address of the first one or more respective virtual IP addresses allocated to the first computing node to an application instance at the first computing node of the respective computing nodes based on the first set of metrics for the first computing node.

11. The non-transitory computer readable medium of claim 10, wherein network topology data corresponding to at least the plurality of computing nodes is maintained, and the network topology data is updated to reflect the binding of the virtual IP address to the application instance.

12. The non-transitory computer readable medium of claim 10, wherein the computing node specific quality metrics data comprises at least one of a latency, a number of hops, and an error rate associated with different target IP addresses.

13. The non-transitory computer readable medium of claim 10, wherein a managing computing node previously generated the virtual IP address and assigned the virtual IP address to the first computing node.

14. The non-transitory computer readable medium of claim 10, wherein multiple computing nodes manage allocation of respective virtual IP addresses to respective application instances at respective ones of the plurality of computing nodes.

15. The non-transitory computer readable medium of claim 10, wherein allocating the virtual IP address to the application instance at the first computing node based on the computing node specific quality metrics data comprises at least ranking multiple virtual IP addresses assigned to the first computing node based on quality metrics data corresponding to target IP addresses to be communicated with using the virtual IP address and selecting a best ranking virtual IP address as the virtual IP address to be allocated to the application instance.

16. The non-transitory computer readable medium of claim 10, wherein the virtual IP address is re-allocated to a different application after a reallocation process is triggered.

17. The non-transitory computer readable medium of claim 16, wherein the reallocation process allocates respective virtual IP addresses based on a combination of multiple rankings corresponding to multiple virtual IP address allocations at a respective computing node.

18. The non-transitory computer readable medium of claim 10, wherein a high availability virtual IP daemon, a high availability metadata interface, and a high availability configuration file are maintained at two or more computing nodes that allocate respective virtual IP addresses, and the two or more computing nodes are within a same cluster.

19. A computing system comprising:
   a memory to hold a set of instructions;
   a computer processor to execute the set of instructions, which when executed cause a set of acts comprising:
      identifying computing node specific quality metrics data for respective computing nodes of a plurality of computing nodes, wherein the computing node specific quality metrics data comprises at least a first set of metrics for a first computing node, the first set of metrics representing characteristics of communications between first one or more respective virtual internet protocol (IP) addresses allocated to the first computing node and second one or more respective virtual IP addresses allocated to one or more other computing nodes; and
      binding a virtual IP address of the first one or more respective virtual IP addresses allocated to the first computing node to an application instance at the first computing node of the respective computing nodes based on the first set of metrics for the first computing node.

20. The computing system of claim 19, wherein network topology data corresponding to at least the plurality of computing nodes is maintained, and the network topology data is updated to reflect the binding of the virtual IP address to the application instance.

* * * * *

UNITED STATES PATENT AND TRADEMARK OFFICE
CERTIFICATE OF CORRECTION

PATENT NO. : 11,483,400 B2
APPLICATION NO. : 17/195973
DATED : October 25, 2022
INVENTOR(S) : Zhu et al.

Page 1 of 1

It is certified that error appears in the above-identified patent and that said Letters Patent is hereby corrected as shown below:

On the Title Page

Column 1, under item (73) Assignee, Line 1, After "Corporation" insert -- (US) --, therefor.

In the Specification

In Column 8, Line 58, delete "we" and insert -- $w_e$ --, therefor.

In Column 8, Line 61, delete "pc" and insert -- $p_e$ --, therefor.

Signed and Sealed this
Sixth Day of June, 2023

Katherine Kelly Vidal
*Director of the United States Patent and Trademark Office*